US008687722B2

(12) United States Patent
Suzuki et al.

(10) Patent No.: US 8,687,722 B2
(45) Date of Patent: Apr. 1, 2014

(54) CHANNEL ESTIMATION IN A MULTI-USER MIMO-OFDM SYSTEM IN THE PRESENCE OF USER TERMINAL SYMBOL-SPECIFIC PHASE OFFSETS

(76) Inventors: Hajime Suzuki, Epping (AU); Joseph Abraham Pathikulangara, Epping (AU); David Humphrey, Carlingford (AU)

( * ) Notice: Subject to any disclaimer, the term of this patent is extended or adjusted under 35 U.S.C. 154(b) by 0 days.

(21) Appl. No.: 13/516,130

(22) PCT Filed: Sep. 1, 2011

(86) PCT No.: PCT/AU2011/001131
§ 371 (c)(1),
(2), (4) Date: Aug. 28, 2012

(87) PCT Pub. No.: WO2012/027793
PCT Pub. Date: Mar. 8, 2012

(65) Prior Publication Data
US 2012/0314751 A1    Dec. 13, 2012

(30) Foreign Application Priority Data

Sep. 1, 2010    (AU) ................................ 2010903932

(51) Int. Cl.
*H04K 1/10*    (2006.01)
(52) U.S. Cl.
USPC .............. 375/260; 341/180; 370/464; 455/45
(58) Field of Classification Search
None
See application file for complete search history.

(56) References Cited

U.S. PATENT DOCUMENTS

2010/0085866 A1    4/2010    Li et al.
2012/0182985 A1*    7/2012    Murakami et al. ............ 370/343

FOREIGN PATENT DOCUMENTS

WO    2008082243    7/2008

OTHER PUBLICATIONS

Australian Patent Office, Written Opinion of the International Searching Authority, Mar. 14, 2013.
Kang et al., "Optimal Training Signals for Joint Estimation of Channel Response and Frequency Offset in Multiuser OFDM," IEEE Conference on Industrial Electronics and Applications (ICIEA), May 23-25, 2007, pp. 2346-2349.
Fu et al., "Two Novel Iterative Joint Frequency-Offset and Channel Estimation Methods for OFDMA Uplink," IEEE Transactions on Communications, vol. 56, No. 3, Mar. 2008, pp. 474-484, Abstract; Sections II, III.

(Continued)

*Primary Examiner* — Adolf Dsouza
(74) *Attorney, Agent, or Firm* — Wood, Herron & Evans, LLP

(57)    ABSTRACT

An OFDM wireless communication system with an access point and a plurality of remote user terminals estimates an uplink channel. The access point receives training symbols transmitted by the user terminals. Each training symbol includes pilot symbols associated with phase offset estimation OFDM sub-carriers. The phase offset estimation sub-carriers include subsets of sub-carriers associated with each respective user terminals. Each subset is used exclusively by the associated user terminal during channel estimation. The channel estimation sub-carriers are used by all user terminals. For each terminal the access point estimates symbol-specific phase offsets specific to the user terminal using the received pilot symbols associated with the user specific subset of the phase offset estimation sub-carriers. The access point also estimates the uplink channel using the user-terminal-symbol-specific phase offset estimates and the received symbols.

12 Claims, 11 Drawing Sheets

(56) References Cited

OTHER PUBLICATIONS

Zhang et al., "Optimal Pilots for Frequency Offset and Channel Estimation in OFDMA Uplink," IEEE Global Telecommunications Conference (GLOBECOM), Nov. 30, 2008-Dec. 4, 2008.

Australian Patent Office, International Search Report, PCT/AU2011/001131, Sep. 26, 2011 (5 pgs.).

Lee, Kyungchun, et al., Frequency-Offset Estimation for MIMO and OFDM Systems Using Orthogonal Training Sequences, IEEE Transactions on Vehicular Technology, vol. 56, No. 1, Jan. 2007, pp. 146-156.

Moose, Paul H., A Technique for Orthogonal Frequency Division Multiplexing Frequency Offset Correction, IEEE Transactions on Communications, vol. 42, No. 10, Oct. 1994, pp. 2908-2914.

Van de Beek, Jan-Jaap, et al., A Time and Frequency Synchronization Scheme for Multiuser OFDM, IEEE Journal on Selecected Areas in Communications, vol. 17, No. 11, Nov. 1999, pp. 1900-1914.

Zogakis, T. Nicholas, et al., The Effect of Timing Jitter on the Performance of a Discrete Multitone System, IEEE Transactions on Communications, vol. 44, No. 7, Jul. 1996, pp. 799-808.

\* cited by examiner

CHANNEL ESTIMATION IN A MULTI-USER MIMO-OFDM SYSTEM IN THE PRESENCE OF USER TERMINAL SYMBOL-SPECIFIC PHASE OFFSETS

TECHNICAL FIELD

The present invention relates generally to wireless communication and, in particular, to multi-user MIMO-OFDM wireless communication systems.

BACKGROUND

FIG. 1 illustrates a point-to-multipoint wireless communication system 100. The system 100 comprises a central node 110 and $N_U$ remote nodes 120-$i_U$ ($i_U$=1, ..., $N_U$) with each remote node establishing a bidirectional wireless communication link, e.g. 130, with the central node 110. Examples of such systems include cellular mobile phone systems and wireless local area networks. The central node 110 is referred to herein as an access point (AP) and the remote nodes 120-$i_U$ as user terminals (UTs). The component of the wireless link 130 from a UT 120-$i_U$ to the AP 110 is called the uplink while the component of the wireless link 130 from the AP 110 to a UT 120-$i_U$ is called the downlink. The AP 110 is connected to a core communications network (not shown).

If the AP 110 is equipped with one antenna, the total capacity of the AP 110, herein called the AP cell capacity, is limited by the spectral efficiency of the AP-UT wireless link 130 and the operational frequency bandwidth. For example, if the spectral efficiency of the AP-UT wireless link 130 (irrespective of the number of UTs) is 4 bits/s/Hz and the operational frequency bandwidth available to the AP 110 is 20 MHz, then the AP cell capacity is 80 Mbits/s. This AP cell capacity is shared among multiple UTs 120-$i_U$ by each UT establishing a wireless link 130 with the AP 110 using a different frequency (frequency division multiple access, or FDMA), a different timeslot (time division multiple access, or TDMA), a different code (code division multiple access, or CDMA), or a combination of these multiple access schemes. If the system 100 comprises only one UT 120-$i_U$, then the single UT 120-$i_U$ can in theory achieve 80 Mbits/s AP-UT wireless link capacity, herein called UT link capacity. However, if the system 100 comprises 20 UTs, then each UT can only in theory achieve 4 Mbits/s on average, irrespective of the different multiple access schemes mentioned above. In practice, the maximum average link capacity achievable for each UT 120-$i_U$ is less than this limit due to overheads such as guard bands for FDMA or guard times for TDMA.

A need therefore exists for wireless communication systems that provide AP cell capacity that increases in proportion to the number of user terminals.

SUMMARY

Disclosed are arrangements that estimate and correct for the UT-symbol-specific phase offsets for the purpose of multi-user multiple-input multiple-output orthogonal frequency division multiplexing (MU-MIMO-OFDM) uplink channel estimation. The disclosed arrangements use FDMA-based phase offset estimation, and apply UT-symbol-specific phase offset correction to CDMA-based channel estimation.

According to a first aspect of the present disclosure, there is provided a method of estimating an uplink channel in a wireless communication system comprising an access point and a plurality of remote user terminals adapted to transmit symbols via OFDM to the access point over said uplink channel, the method comprising:

receiving, at the access point, one or more training symbols transmitted by the user terminals, each training symbol comprising pilot symbols associated with phase offset estimation OFDM sub-carriers of said training symbol, the phase offset estimation sub-carriers comprising subsets of sub-carriers associated with respective user terminals, wherein each subset is used exclusively by the associated user terminal during channel estimation, and further symbols associated with channel estimation OFDM sub-carriers of said training symbol, wherein the channel estimation sub-carriers are used in common by all the user terminals; estimating, for each user terminal, symbol-specific phase offsets specific to the user terminal using the received pilot symbols associated with the subset of the phase offset estimation sub-carriers associated with the user terminal; and estimating the uplink channel using the user-terminal-symbol-specific phase offset estimates and the received further symbols.

According to a second aspect of the present disclosure, there is provided a wireless communication system comprising an access point, and a plurality of remote user terminals adapted to transmit symbols via OFDM to the access point over an uplink channel, wherein the access point is adapted to: receive one or more training symbols transmitted by the user terminals, each training symbol comprising: pilot symbols associated with phase offset estimation OFDM sub-carriers of said training symbol, the phase offset estimation sub-carriers comprising subsets of sub-carriers associated with respective user terminals, wherein each subset is used exclusively by the associated user terminal during channel estimation, and further symbols associated with channel estimation OFDM sub-carriers of said training symbol, wherein the channel estimation sub-carriers are used in common by all the user terminals; estimate, for each user terminal, symbol-specific phase offsets specific to the user terminal using the received pilot symbols associated with the subset of the phase offset estimation sub-carriers associated with the user terminal; and estimate the uplink channel using the user-terminal-symbol-specific phase offset estimates and the received further symbols.

According to a third aspect of the present disclosure, there is provided an access point in a wireless communication system further comprising a plurality of remote user terminals adapted to transmit symbols via OFDM to the access point over an uplink channel, the access point being adapted to: receive one or more training symbols transmitted by the user terminals, each training symbol comprising: pilot symbols associated with phase offset estimation OFDM sub-carriers of said training symbol, the phase offset estimation sub-carriers comprising subsets of sub-carriers associated with respective user terminals, wherein each subset is used exclusively by the associated user terminal during channel estimation, and further symbols associated with channel estimation OFDM sub-carriers of said training symbol, wherein the channel estimation sub-carriers are used in common by all the user terminals; estimate, for each user terminal, symbol-specific phase offsets specific to the user terminal using the received pilot symbols associated with the subset of the phase offset estimation sub-carriers associated with the user terminal; and estimate the uplink channel using the user-terminal-symbol-specific phase offset estimates and the received further symbols.

Other aspects of the invention are also disclosed.

DESCRIPTION OF THE DRAWINGS

At least one embodiment of the present invention will now be described with reference to the drawings, in which.

DETAILED DESCRIPTION

Figure 1:
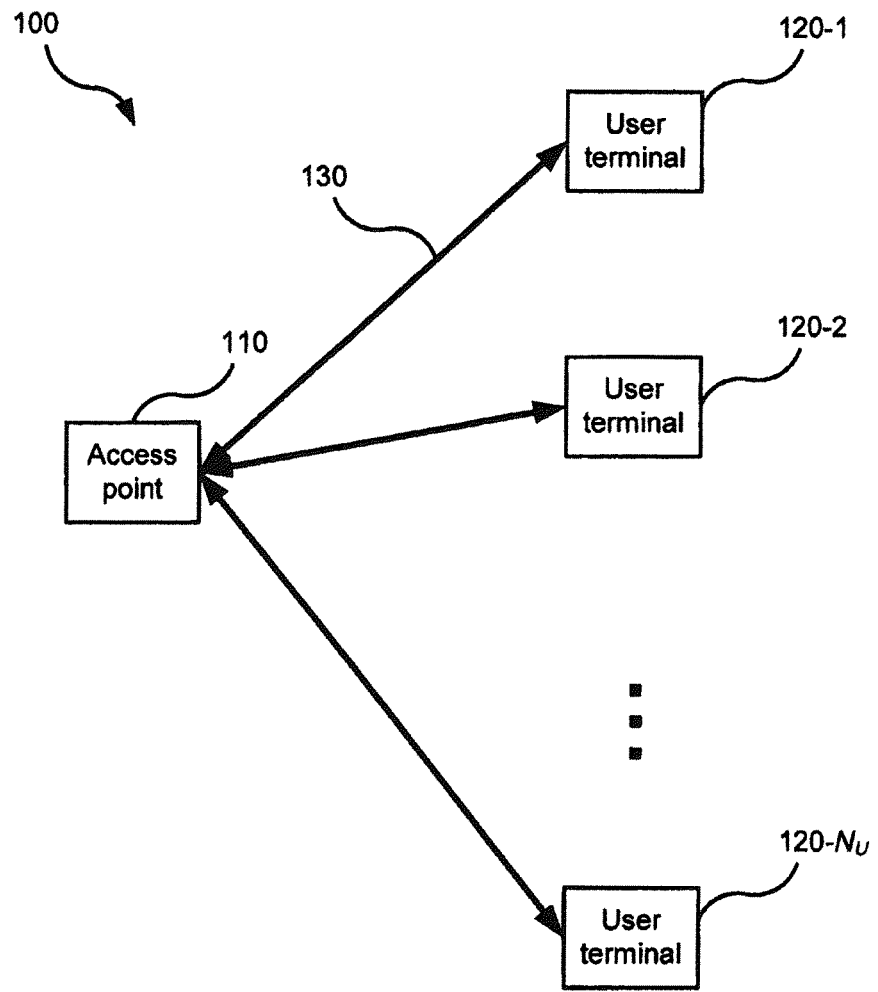
FIG. 1 illustrates a point-to-multipoint wireless communication system in which the embodiments of the invention may be practised.

Where reference is made in any one or more of the accompanying drawings to steps and/or features, which have the same reference numerals, those steps and/or features have for the purposes of this description the same function(s) or operation(s), unless the contrary intention appears.

A multi-user multiple-input multiple-output (MU-MIMO)-based scheme may be employed to increase the spectral efficiency of a point-to-multipoint wireless communication system such as the system 100 of FIG. 1. In MU-MIMO, the AP 110 is equipped with multiple antennas. By synchronising the symbol timing (within a fraction of the symbol period) and the carrier frequency (so that carrier offset among the UTs and the AP will not cause degradation in symbol detection performance) among the UTs, conventional MU-MIMO detection schemes can be used at the AP 110 to detect uplink symbols from multiple UTs sent at the same time and in the same frequency band without using different codes. The AP cell capacity in theory increases in proportion to the number of synchronised UTs, up to the number of AP antennas. This technique is referred to as space division multiple access (SDMA).

Synchronisation of symbol timing and carrier frequency among multiple UTs 120-$i_U$ is a challenging task in implementing MU-MIMO uplinks. Typically, the AP 110 estimates each UT's time and frequency offset from that UT's uplink transmission and returns the offset information on a downlink. Each UT 120-$i_U$ then uses this information to adapt its time and frequency reference to be synchronised with the AP 110 and thus to be synchronised also with other UTs. However, a perfect synchronisation among UTs is difficult to achieve, due in part to imperfections in the estimation and the adaptation, and the stability of oscillators at the AP 110 and the UTs. Thus in conventional SDMA systems there remains a small timing offset and carrier frequency offset among UTs.

The effects of small timing offsets and carrier frequency offsets can be mitigated by using orthogonal frequency division multiplexing (OFDM). While the required accuracy of the frequency offset estimation and adaptation for an SDMA system using OFDM is generally more stringent than that of a system using single carrier modulation, the time offset requirements are relaxed by an additional extension of the OFDM cyclic prefix. When an OFDM system has a cyclic prefix longer than the length of the channel impulse response, then as long as the UT time offset is shorter than the difference between the length of the cyclic prefix and the length of the channel impulse response, the cyclic appearance of the OFDM symbol is preserved. If the carrier frequency offset is small enough (i.e. a fraction of OFDM sub-carrier spacing), the carrier frequency offset appears as a common phase offset across the OFDM sub-carriers that is proportional to the carrier frequency offset. Due to instability of the local oscillator of the transmitter and the receiver at each UT 120-$i_U$, the common phase offset can vary between symbols as well as between UTs.

UT-symbol-specific phase offsets have been estimated in OFDM systems by inserting known symbols (referred to as pilot symbols) in selected sub-carriers within each data OFDM symbol. In this case one OFDM symbol comprises one or more pilot sub-carriers and one or more data sub-carriers. The phase offset is estimated from the pilot sub-carriers. The same technique can be applied in a MU-MIMO-OFDM uplink. As long as the MU-MIMO-OFDM uplink channel is estimated accurately, the phase offset may be estimated from the pilot sub-carriers embedded in each OFDM data symbol, and corrected for during uplink data detection.

The problem then becomes one of accurately estimating the MU-MIMO-OFDM uplink channel in the presence of UT-symbol-specific phase offsets. One approach is to use either TDMA or FDMA, such that only one UT transmits training symbols at a particular time or frequency during channel estimation to avoid interference from the other UTs. However, this approach is inefficient for a system optimised for a particular range of transmitting power. In order to achieve the same effective signal to noise ratio (SNR) as CDMA-based channel estimation described below, the transmitting power during channel estimation needs to be amplified in order to compensate for the non-transmitting time (in the TDMA case) or frequency (in the FDMA case). CDMA-based channel estimation, typically utilised in MIMO-OFDM based WLAN systems, e.g. IEEE 802.11n, uses training symbols orthogonal in code to solve the problem of power imbalance as well as to improve signal-to-noise ratio. However, CDMA-based channel estimation is subject to substantial error in the presence of UT-symbol-specific phase offsets because the orthogonality of the training symbols is compromised by the phase offsets.

The disclosed arrangements utilise the characteristic of an OFDM system that phase offset induced by carrier frequency variation is constant over different OFDM sub-carriers to estimate UT-symbol-specific phase offsets. The disclosed arrangements enable an efficient UT-symbol-specific phase offset correction to a CDMA-based channel estimation method. The disclosed arrangements also utilise the coherence of frequency responses typically present in an OFDM system to interpolate OFDM sub-carrier channel coefficients as part of the channel estimation.

Notation Convention

Throughout this disclosure, a scalar (possibly complex-valued) quantity is denoted by an italic lowercase letter, e.g. a. a(b) indicates that a scalar a is a function of a scalar b. A vector is denoted by a bold lowercase letter, e.g. a. A matrix is denoted by a bold uppercase letter, e.g. A. The notation A=[a (n,m)] indicates that the n-th row and m-th column entry of a matrix A is a(n,m). A(b)=[a(n,m,b)] indicates that a matrix A, and hence its entries a(n, m), are functions of a scalar b.

An OFDM symbol is a set of complex-valued scalars $x(i_F)$, where $i_F=1, \ldots, N_F$, and $N_F$ is the number of OFDM sub-carriers. The sub-carriers of an OFDM training symbol for channel estimation according to the disclosed arrangements are categorised either as phase offset estimation sub-carriers or channel estimation sub-carriers. Each UT is associated with a subset of size $N_C$ of the phase offset estimation sub-carriers that are used exclusively by that UT to transmit pilot symbols during channel estimation. The other UTs transmit zeros at the phase offset estimation sub-carriers associated with a particular UT. For this reason, the phase offset estimation may be categorised as FDMA-based. The remaining $N_E=N_F-N_C\times N_U$ channel estimation sub-carriers are used in common by all the UTs to transmit further symbols for the purpose of channel estimation.

Figure 2:
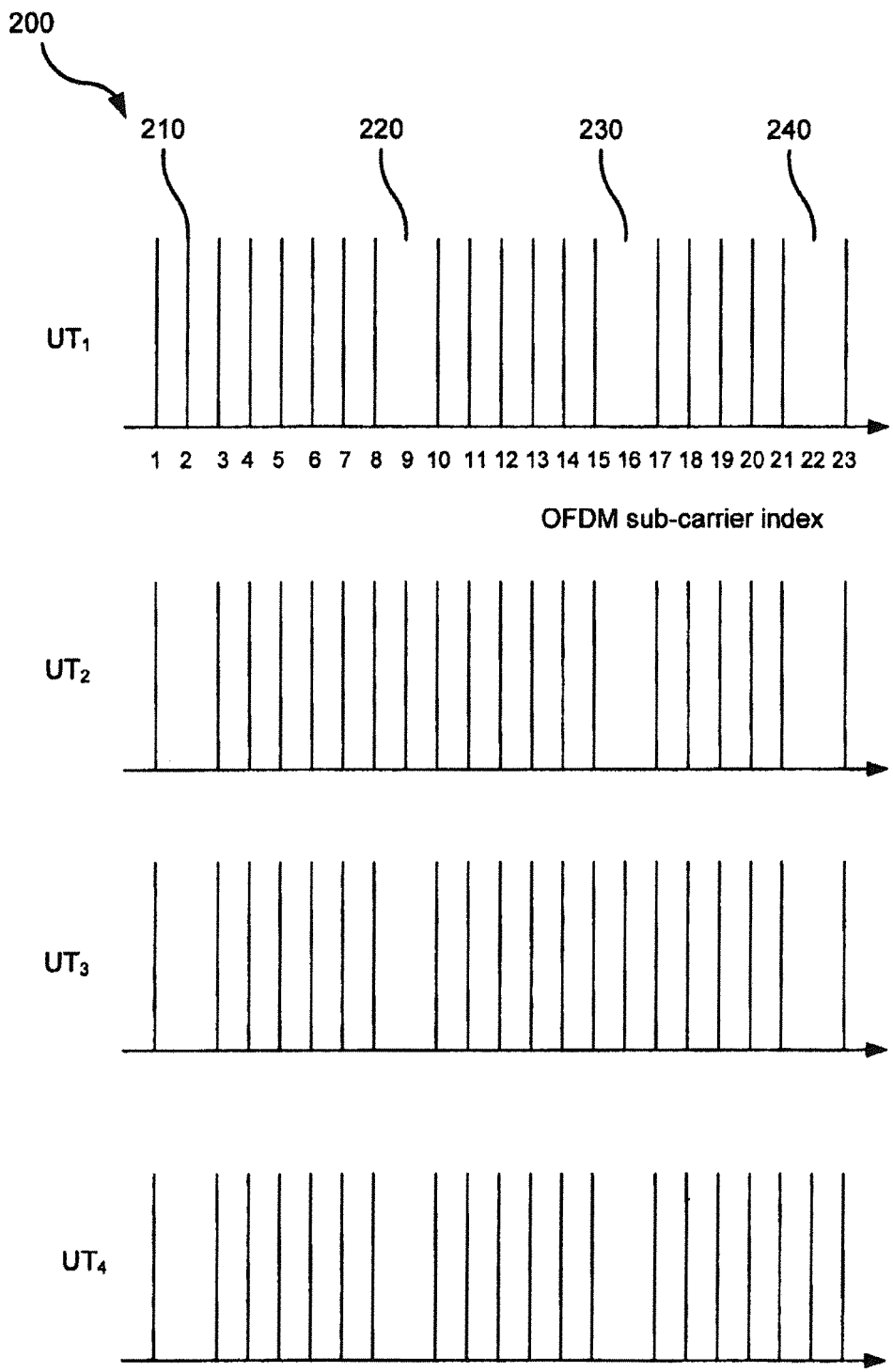
FIG. 2 shows an example allocation of OFDM sub-carriers for uplink channel estimation in the system of FIG. 1 according to one embodiment.

FIG. 2 shows an example allocation 200 of OFDM sub-carriers in a training symbol for MU-MIMO-OFDM uplink channel estimation in the system 100 of FIG. 1 according to one embodiment. In the example allocation 200, the number $N_U$ of UTs is four, the number $N_F$ of OFDM sub-carriers is 23, and the number $N_C$ of phase offset estimation sub-carriers for each UT is 1. The phase offset estimation sub-carrier 2 (210) is used exclusively by $UT_1$ to transmit a pilot symbol for the purpose of estimating symbol-specific phase offsets that are specific to $UT_1$. The remaining UTs transmit zeros at sub-carrier 2 (210). The phase offset estimation sub-carrier 9 (220) is used exclusively by $UT_2$ to transmit a pilot symbol for the purpose of estimating symbol-specific phase offsets that are specific to $UT_2$. The phase offset estimation sub-carrier 16 (230) is used exclusively by $UT_3$ to transmit a pilot symbol for the purpose of estimating symbol-specific phase offsets that are specific to $UT_3$. The phase offset estimation sub-carrier 22 (240) is used exclusively by $UT_4$ to transmit a pilot symbol for the purpose of estimating symbol-specific phase offsets that are specific to $UT_4$.

The indices $i_F$ of the $N_C$ phase offset estimation sub-carriers associated with the UT $120\text{-}i_U$ are themselves indexed by $i_C$, where $i_C=1, \ldots, N_C$, and are therefore denoted as $i_F(i_U, i_C)$. In the example allocation 200, $i_F(1, 1)=2, i_F(2, 1)=9, i_F(3, 1)=16$, and $i_F(4, 1)=22$. UTs other than $120\text{-}i_U$ transmit zeros at the $N_C$ phase offset estimation OFDM sub-carrier(s) indexed by $i_F(i_U, i_C)$ during channel estimation.

The indices $i_F$ of the $N_E$ channel estimation sub-carriers are themselves indexed by $i_E$, where $i_E=1, \ldots, N_E$, and are therefore denoted as $i_F(i_E)$. In the example allocation 200, $N_E=19$ and $i_F(i_E)=1, 3, 4, 5, 6, 7, 8, 10, 11, 12, 13, 14, 15, 17, 18, 19, 20, 21$, and 23.

A sequence of $N_S$ OFDM symbols transmitted by the $N_U$ UT uplinks is collectively represented by the $N_U$ by $N_S$ matrix $X(i_F)=[x(i_U,i_S,i_F)]$, where $i_S=1, \ldots, N_S$ is an index of OFDM symbols. The received symbols from the $N_A$ AP receive antennas are collectively represented by the $N_A$ by $N_S$ matrix $R(i_F)=[r(i_A,i_S,i_F)]$, where $i_A=1, \ldots, N_A$ is an index of AP receive antennas. The MU-MIMO-OFDM uplink channel for the $i_F$-th OFDM sub-carrier is modelled as $$R(i_F)=G(i_F)[P\cdot X(i_F)]+N(i_F) \quad (1)$$

where:

$P=[p(i_U,i_S)]$ is an $N_U$ by $N_S$ matrix containing UT-symbol-specific phase offsets induced by UT carrier frequency offsets;

$G(i_F)=[g(i_A,i_U,i_F)]$ is an $N_A$ by $N_U$ matrix representing the uplink channel at the $i_F$-th OFDM sub-carrier; and $N(i_F)=[n(i_A,i_S,i_F)]$ is an $N_A$ by $N_S$ matrix representing complex-valued noise at the $i_F$-th OFDM sub-carrier.

The phase offsets $p(i_U, i_S)$, which have magnitude identically equal to one, are independent of the OFDM sub-carrier index $i_F$ and are therefore common to all OFDM sub-carriers. The "dot" in equation (1) represents an element-wise product between two $N_U$ by $N_S$ matrices rather than a matrix product.

The aim of uplink data symbol detection is to recover the transmitted symbols X from the received symbols R in the presence of stochastic noise N. Clearly from equation (1) this requires an estimate of the uplink channel G as well as of the phase offsets P. This is the purpose of channel estimation according to the present disclosure.

In conventional CDMA-based channel estimation, a UT transmits training symbols X that are code-orthogonal to the training symbols transmitted from other UTs. The use of orthogonal codes enhances channel estimation signal-to-noise ratio. However, in the presence of unknown phase offsets P at the access point 110, the orthogonality of the transmitted symbols is compromised, thus affecting the estimation of the uplink channel G.

In the disclosed arrangements, the training symbols X do not need to be orthogonal. The uplink channel G can be estimated as long as the transmitted training symbols X are known to the access point 110. However, the signal-to-noise ratio of the estimate is maximised if the training symbols are orthogonal.

Figure 3:
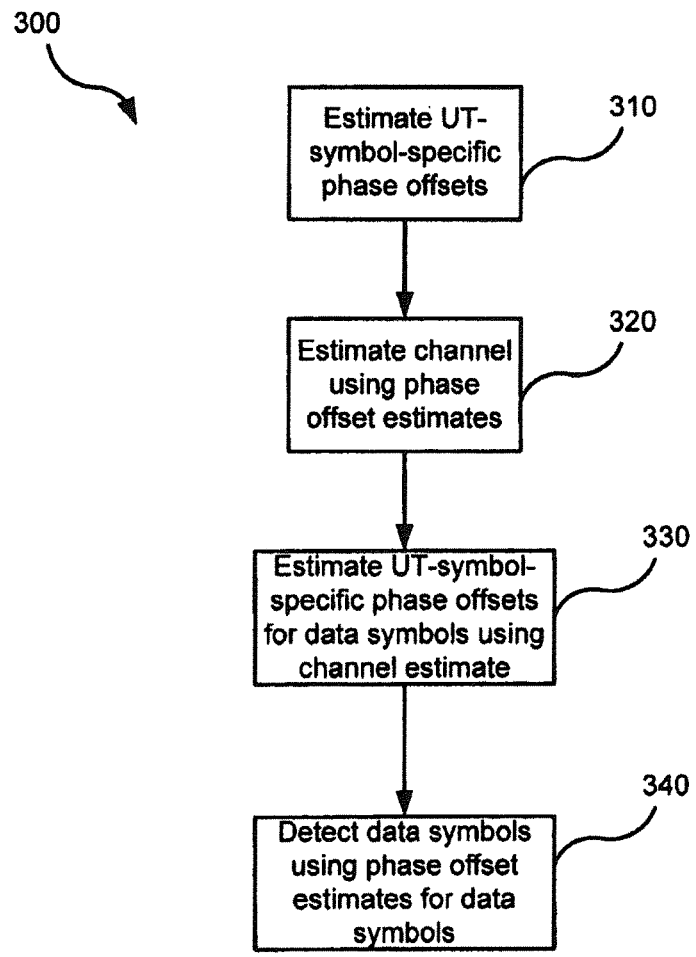
FIG. 3 is a flow chart illustrating a method of detecting symbols in the system of FIG. 1 according to the embodiment.

FIG. 3 is a flow chart illustrating a method 300 of detecting uplink symbols in the system 100 of FIG. 1 according to the embodiment. The method 300 is carried out by the access point 110 in the system 100.

In preparation for the application of the method 300, a rough synchronisation in time and carrier frequency of the UTs $120\text{-}i_U$ has preferably been carried out using known methods. The rough synchronisation makes the time offset of each UT $120\text{-}i_U$ shorter than the difference between the length of the cyclic prefix and the length of the channel impulse response, and the carrier frequency offset of each UT $120\text{-}i_U$ a fraction of OFDM sub-carrier spacing, so that the carrier frequency offset appears as a common phase offset across the OFDM sub-carriers, as in the model equation (1).

The method 300 starts at step 310, where the access point 110 estimates the UT-symbol-specific phase offsets $P=[p(i_U, i_S)]$ as described in detail below with reference to FIG. 9a. The estimated phase offsets are used by the access point 110 in the following step 320 to estimate the uplink channel G as described in detail below with reference to FIG. 9b. Steps 310 and 320 constitute the channel estimation phase of the symbol detection method, while the following steps 330 and 340 constitute the data symbol detection phase of the symbol detection method. The uplink channel G is independent of the symbol interval, so its estimate from the training phase may be used during the data symbol detection phase of the method 300. However, the phase offsets P are symbol-specific and must therefore also be estimated during the data detection phase. At step 330, the access point 110 therefore estimates the UT-symbol-specific phase offsets for received data symbols using the estimate of the uplink channel G, as described in detail below with reference to FIG. 10a. At the final step 340, the access point 110 detects the transmitted data symbols using the estimate of the uplink channel G and the estimates of the UT-symbol-specific phase offsets P for the received data symbols, as described in detail below with reference to FIG. 10b.

To overcome the power imbalance problem encountered by TDMA-based or FDMA-based channel estimation schemes, a similar power per channel estimation sub-carrier is transmitted during the channel estimation phase as during the data detection phase.

Figure 4:
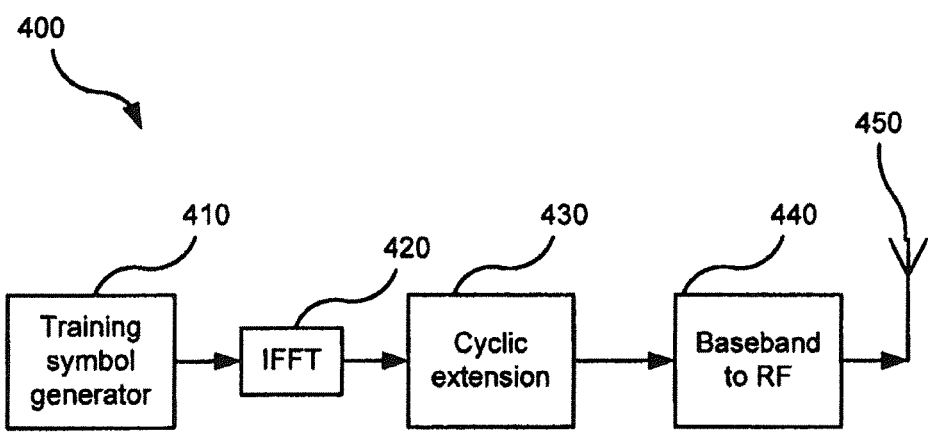
FIG. 4 is a block diagram of the uplink channel estimation signal processing at a user terminal in the system of FIG. 1 according to the embodiment.

FIG. 4 is a block diagram of the uplink channel estimation signal processing 400 at a UT 120-$i_U$ in the system 100 of FIG. 1. The Training Symbol Generator 410, which is unique to the UT 120-$i_U$, generates $N_S$ predetermined OFDM training symbols. The training symbols are structured as described above and illustrated in the example allocation 200 in FIG. 2. In addition, the training symbols may contain frequency-domain zeros at the lower and the higher ends of the spectrum. The output from the Training Symbol Generator 410 is passed to an IFFT module 420 that generates a time domain signal from the training symbols. A cyclic extension is added to the time domain signal by the Cyclic Extension module 430, whose output is in turn passed to a Baseband to RF module 440 for modulation to an RF signal that is transmitted through the air by a transmit antenna 450. In an alternative implementation, for when the IFFT module 420 is configured to produce an IF signal, the Baseband to RF module 440 is replaced by an Intermediate Frequency (IF) to RF module. In a further alternative implementation, for when the IFFT module 420 is configured to produce an RF signal, no Baseband to RF module 440 or IF to RF module is present.

Figure 5:
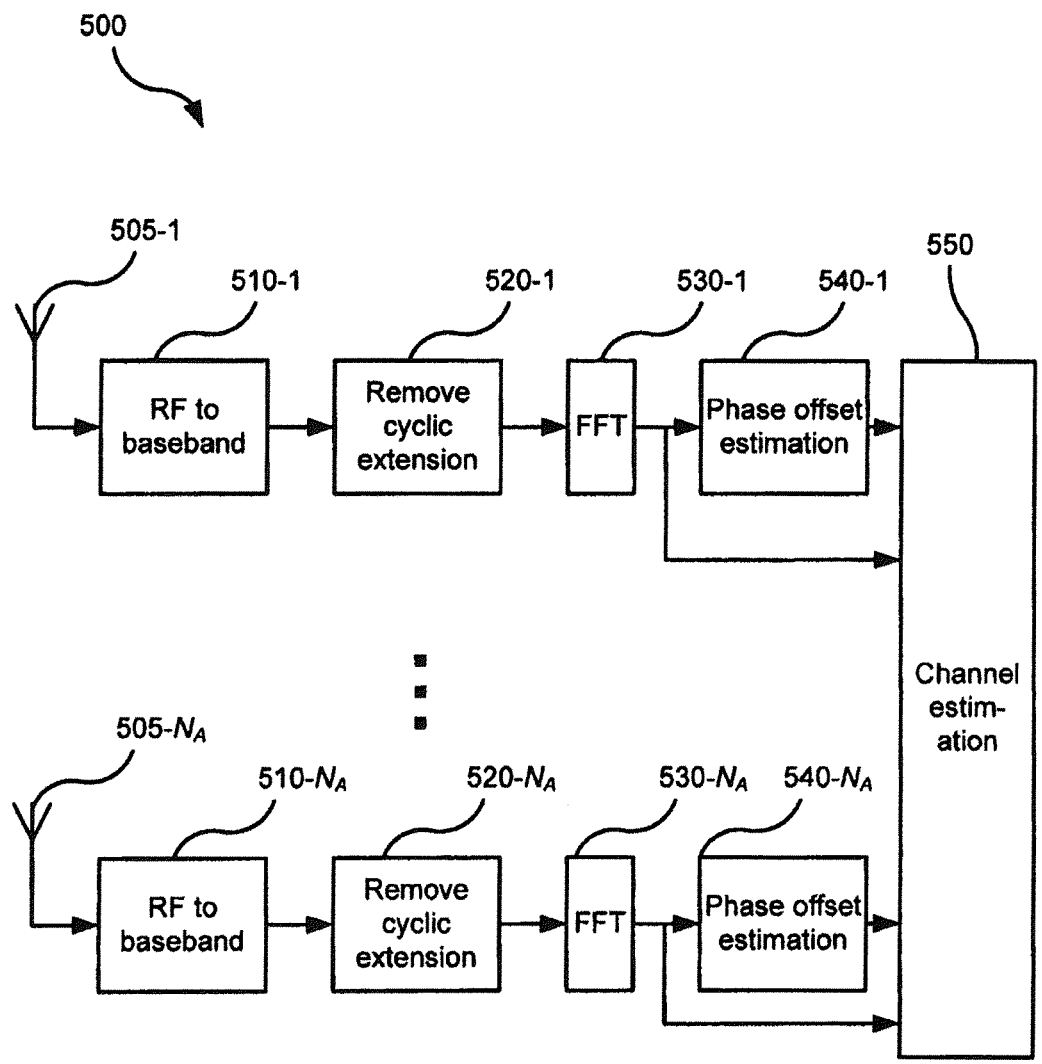
FIG. 5 is a block diagram of the uplink channel estimation signal processing at the access point in the system of FIG. 1 according to the embodiment.

FIG. 5 is a block diagram of the uplink channel estimation signal processing 500 at the access point 110 in the system 100 of FIG. 1. The access point 110 has $N_A$ receive antennas 505-1 to 505-$N_A$. Each receive antenna 505-$i_A$ feeds an RF to baseband module 510-$i_A$ that converts the received RF signal to baseband. The cyclic extension is removed from the output of the RF to Baseband module 510-$i_A$ by a Remove Cyclic Extension module 520-$i_A$. The output of the Remove Cyclic Extension module 520-$i_A$ is grouped by the size of the FFT (typically a power of 2 such as 2048) and is passed to an FFT module 530-$i_A$ for conversion to a (frequency-domain) OFDM symbol that comprises phase offset estimation sub-carrier data, channel estimation sub-carrier data, and "zero" data as described above. The phase offset estimation sub-carrier data is passed to a phase offset estimation module 540-$i_A$ for the estimation of UT-symbol-specific phase offsets, as in step 310, described in detail below with reference to FIG. 9a. The estimated phase offsets from the phase offset estimation modules 540-1 to 540-$N_A$ are passed, along with the channel estimation sub-carrier data, to a Channel Estimation module 550. The Channel Estimation module 550 uses the phase offset estimates to estimate the uplink channel, as in step 320, as described in detail below with reference to FIG. 9b.

Figure 6:
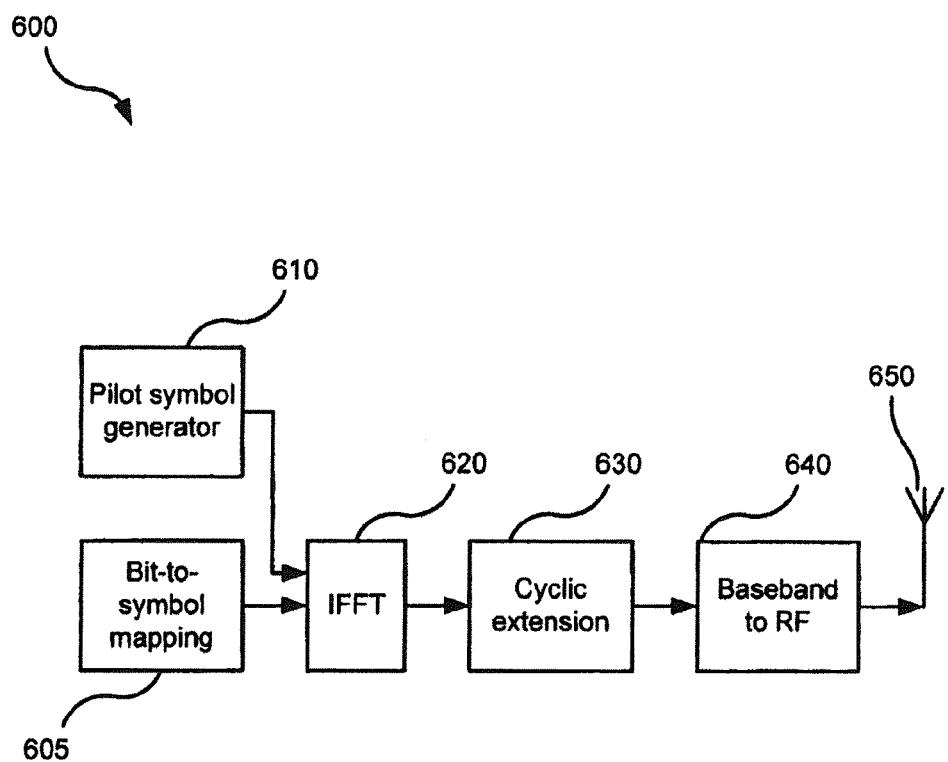
FIG. 6 is a block diagram of the uplink data transmission signal processing at a user terminal in the system of FIG. 1 according to the embodiment.

FIG. 6 is a block diagram of the uplink data transmission signal processing 600 at a UT 120-$i_U$ in the system 100 of FIG. 1. The bit-to-symbol mapping module 605 converts data bits to data symbols according to a predetermined mapping scheme such as Quadrature Amplitude Modulation (QAM). The data symbols from the mapping module 605 are combined with pilot symbols from a Pilot Symbol Generator 610 by an IFFT module 620 that produces a time domain data stream comprising a sequence of data frames. A frame is a group of time-domain symbols produced by one IFFT operation. Each time domain data frame is cyclically extended by the Cyclic Extension module 630. The data stream of cyclically extended data frames is converted to an RF signal by a Baseband to RF module 640 for transmission over the air by a transmit antenna 650. In an alternative implementation, for when the IFFT module 620 is configured to produce an IF signal, the Baseband to RF module 640 is replaced by an IF to RF module. In a further alternative implementation, for when the IFFT module 620 is configured to produce an RF signal, no Baseband to RF module 640 or IF to RF module is present.

Figure 7:
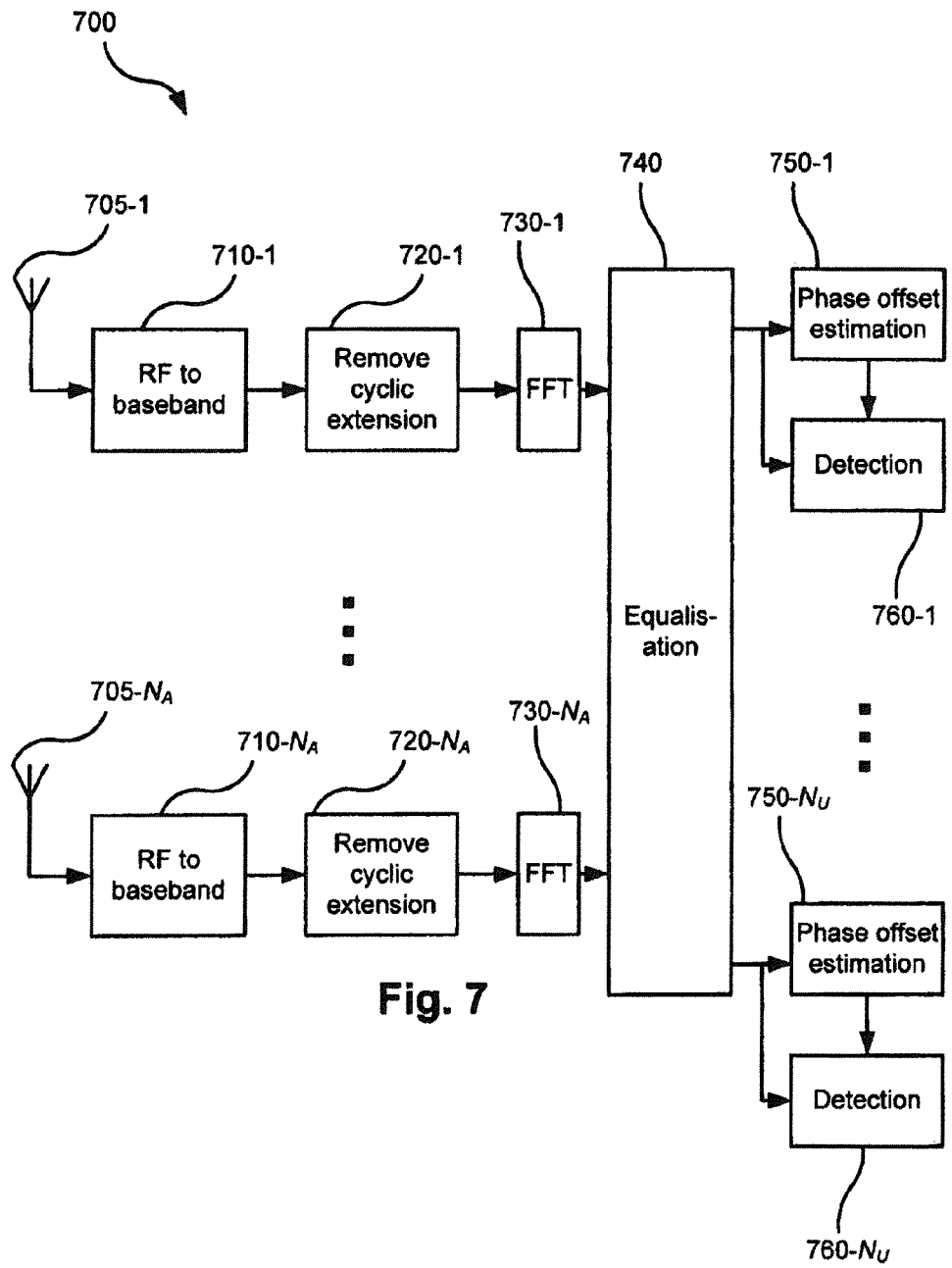
FIG. 7 is a block diagram of the uplink data detection signal processing at the access point in the system of FIG. 1 according to the embodiment.

FIG. 7 is a block diagram of the uplink data detection signal processing 700 at the access point 110 in the system 100 of FIG. 1. The access point 110 has $N_A$ receive antennas 705-1 to 705-$N_A$, which may be identified with the antennas 505-1 to 505-$N_A$ of FIG. 5. Each receive antenna 705-$i_A$ feeds an RF to baseband module 710-$i_A$ (identifiable with the RF to baseband module 510-$i_A$) that converts the received RF signal to baseband. The cyclic extension is removed from the output of the RF to Baseband module 710-$i_A$ by a Remove Cyclic Extension module 720-$i_A$ (identifiable with the Remove Cyclic Extension module 520-$i_A$). The output of the Remove Cyclic Extension module 720-$i_A$ is grouped by the size of the FFT and is passed to an FFT module 730-$i_A$ (identifiable with the FFT module 530-$i_A$) for conversion to a (frequency-domain) OFDM symbol. Sets of symbols at each OFDM sub-carrier (a set comprises $N_A$ symbols corresponding to the $N_A$ AP antennas) are equalised at an equalisation module 740 as described in detail below. The output from the equalisation module 740 comprises sets of data symbols at each OFDM sub-carrier (a set comprises $N_U$ symbols corresponding to the $N_U$ UTs). The sub-carriers are categorised as phase offset estimation sub-carriers or data sub-carriers. The phase offset estimation sub-carriers are not necessarily the same as the phase offset estimation sub-carriers used during the channel estimation phase. The phase offset estimation sub-carriers in both the channel estimation phase and the data detection phase are typically chosen to have equal spacing among the OFDM sub-carriers, as in the allocation 200 of FIG. 2. The phase offset estimation sub-carrier data for the UT 120-$i_U$ is passed to a phase offset estimation module 750-$i_U$, corresponding to the UT 120-$i_U$. The phase offset estimation module 750-$i_U$ estimates, for each OFDM data symbol, the UT-symbol-specific phase offsets, as in step 330, as described in detail below with reference to FIG. 10a. The data sub-carrier data for the UT 120-$i_U$ is passed to a detection module 760-$i_U$, which, together with the UT-symbol-specific phase offset estimates provided by the phase offset estimation module 750-$i_U$, performs symbol detection and de-mapping to recover the binary data corresponding to the UT 120-$i_U$, as in step 340, described in detail below with reference to FIG. 10b.

For MU-MIMO-OFDM uplink channel estimation according to the embodiment, the number $N_S$ of symbols in the training sequence is greater than or equal to the number $N_U$ of UTs. At the $i_S$-th training symbol interval, the UT 120-$i_U$ transmits a pilot symbol $x(i_U, i_S, i_F(i_U, i_C))$ at the phase offset estimation sub-carrier indexed by $i_F(i_U, i_C)$. At the $i_S$-th training symbol interval, the $i_A$-th FFT module 530-$i_A$ generates a received pilot symbol $r(i_A, i_S, i_F(i_U, i_C))$ at the phase offset estimation sub-carrier indexed by $i_F(i_U, i_C)$. As mentioned above, all UTs other than 120-$i_U$ transmit zeros at the phase offset estimation sub-carrier(s) indexed by $i_F(i_U, i_C)$. Therefore, using equation (1), the $i_S$-th received symbol from the $i_A$-th FFT module 530-$i_A$ at the phase offset estimation sub-carrier indexed by $i_F(i_U, i_C)$ is given by $$r(i_A, i_S, i_F(i_U, i_C)) = g(i_A, i_U, i_F(i_U, i_C)) P(i_U, i_C) x(i_U, i_S, i_F(i_U, i_C)) + n(i_A, i_S, i_F(i_U, i_C)) \qquad (2)$$

The UT-symbol-specific phase offset $p(i_U, i_S)$ is normalised by that of the first training symbol in the training sequence:

$$p'(i_U, i_S) = \frac{p(i_U, i_S)}{p(i_U, 1)} \quad (3)$$

Likewise, the $i_S$-th received symbol $r(i_A, i_S, i_F(i_U, i_C))$ is normalised by the $i_S$-th transmitted pilot symbol $x(i_U, i_S, i_F(i_U, i_C))$:

$$r'(i_A, i_S, i_F(i_U, i_C)) = \frac{r(i_A, i_S, i_F(i_U, i_C))}{x(i_U, i_S, i_F(i_U, i_C))} \quad (4)$$

Then the $i_S$-th normalised received symbol $r(i_A, i_S, i_F(i_U, i_C))$ is further normalised by the first normalised received symbol $r'(i_A, 1, i_F(i_U, i_C))$:

$$\frac{r'(i_A, i_S, i_F(i_U, i_C))}{r'(i_A, 1, i_F(i_U, i_C))} = \frac{g(i_A, i_U, i_F(i_U, i_C))p(i_U, i_S) + n'(i_A, i_S, i_F(i_U, i_C))}{g(i_A, i_U, i_F(i_U, i_C))p(i_U, 1) + n'(i_A, 1, i_F(i_U, i_C))}$$

$$= \frac{p(i_U, i_S) + (n'(i_A, i_S, i_F(i_U, i_C))/g(i_A, i_U, i_F(i_U, i_C)))}{p(i_U, 1) + (n'(i_A, 1, i_F(i_U, i_C))/g(i_A, i_U, i_F(i_U, i_C)))}$$

$$\approx \frac{p(i_U, i_S)}{p(i_U, 1)}$$

$$= p'(i_U, i_S) \quad (5)$$

where $$n'(i_A, i_S, i_F(i_U, i_C)) = \frac{n(i_A, i_S, i_F(i_U, i_C))}{x(i_U, i_S, i_F(i_U, i_C))} \quad (6)$$

Hence $p'(i_U, i_S)$ can be estimated by using the first and $i_S$-th normalised received symbols from each FFT module 530-$i_A$ at each OFDM phase offset sub-carrier $i_F(i_U, i_C)$ corresponding to the UT 120-$i_U$. A total of $N_A \times N_C$ estimates of $p'(i_U, i_S)$ may be obtained in this fashion. The UT-symbol-specific phase offset estimates $\tilde{p}'(i_U, i_S)$ are obtained from the $N_A \times N_C$ estimates of $p'(i_U, i_S)$, for example by averaging, or intelligent selection using, for example, knowledge of the level of the enhanced noise. In one implementation, a UT-symbol-specific phase offset estimate is computed by averaging as follows:

$$\tilde{p}'(i_U, i_S) = \frac{1}{N_A N_C} \sum_{i_A=1}^{N_A} \sum_{i_C=1}^{N_C} \frac{r'(i_A, i_S, i_F(i_U, i_C))}{r'(i_A, 1, i_F(i_U, i_C))} \quad (7)$$

An estimate of the UT-symbol-specific phase offset matrix P may then be formed as $$\tilde{P} = [\tilde{p}'(i_U, i_S)] \quad (8)$$

where $\tilde{p}'(i_U, 1)$ is assumed to be equal to one.

Given the UT-symbol-specific phase offset estimate matrix $\tilde{P}$, the uplink MU-MIMO-OFDM channel may be estimated with UT-symbol-specific phase offset correction using the further symbols transmitted and received on the $N_E$ channel estimation sub-carriers indexed by $i_E$ from equation (1) as follows:

$$\tilde{G}(i_F(i_E)) = R(i_F(i_E))[\tilde{P} \cdot X(i_F(i_E))]^{-1} \quad (9)$$

where $\tilde{G}(i_F(i_E)) = [\tilde{g}(i_A, i_U, i_F(i_E))]$, and the −1 superscript indicates a pseudo-inverse operation:

$$(\tilde{P} \cdot X)^{-1} = ((\tilde{P} \cdot X)^H (\tilde{P} \cdot X))^{-1} (\tilde{P} \cdot X)^H \quad (10)$$

where the superscript H stands for the complex conjugate transpose of a matrix.

Note that equation (9) cannot be used at the $N_C \times N_U$ phase offset estimation sub-carriers indexed by $i_F(i_U, i_C)$, since at those sub-carriers the phase-corrected matrix of transmitted symbols $\tilde{P} \cdot X(i_F(i_U, i_C))$ is not pseudo-invertible. The channel estimates at the $N_C \times N_U$ phase offset estimation sub-carriers indexed by $i_F(i_U, i_C)$ are therefore derived by interpolation from the channel estimates at neighbouring channel estimation sub-carriers. In one implementation, the interpolation is bilinear interpolation separately in amplitude and phase, computed as follows:

$$|\tilde{g}(i_A, i_U, i_F(i_U, i_C))| = \quad (11a)$$
$$\frac{|\tilde{g}(i_A, i_U, i_F(i_U, i_C) - 1)| + |\tilde{g}(i_A, i_U, i_F(i_U, i_C) + 1)|}{2}$$

$$\angle \tilde{g}(i_A, i_U, i_F(i_U, i_C)) = \quad (11b)$$
$$\frac{\angle \tilde{g}(i_A, i_U, i_F(i_U, i_C) - 1) + \angle \tilde{g}(i_A, i_U, i_F(i_U, i_C) + 1)}{2}$$

These interpolations require that $\min(i_F(i_E)) < \min(i_F(i_U, i_C))$ and $\max(i_F(i_E)) > \max(i_F(i_U, i_C))$, and that the phase offset estimation sub-carriers indexed by $i_F(i_U, i_C)$ are separated by at least one sub-carrier. The result of the interpolations is a channel estimate $\tilde{G}(i_F)$ at all $N_F$ OFDM sub-carriers.

During the data detection phase, $N_P$ OFDM sub-carriers are categorised as pilot sub-carriers while the remaining $N_D$ OFDM sub-carriers are categorised as data sub-carriers. The index $i_P = 1, \ldots, N_P$ indexes the $N_P$ pilot sub-carriers whereas the index $i_D = 1, \ldots, N_D$ indexes the $N_D = N_F - N_P$ data sub-carriers. An OFDM data symbol transmitted from the UT 120-$i_U$ comprises pilot sub-carrier symbols $x(i_U, i_S, i_F(i_P))$, known at the access point 110, and data sub-carrier symbols, $x(i_U, i_S, i_F(i_D))$, that need to be detected at the access point 110.

At the $i_S$-th OFDM symbol interval, the received pilot symbol $r(i_A, i_S, i_F(i_P))$ at the $i_P$-th pilot sub-carrier generated by the $i_A$-th FFT module 730-$i_A$ is given by equation (1) as $$r(i_A, i_S, i_F(i_P)) = \quad (12)$$
$$\sum_{i_U=1}^{N_U} [g(i_A, i_U, i_F(i_P))p(i_U, i_S)x(i_U, i_S, i_F(i_P))] + n(i_A, i_S, i_F(i_P))$$

A $N_U$ by $N_A$ pseudo-inverse, $\tilde{W}(i_F) = [\tilde{w}(i_U, i_A, i_F)]$, of the channel estimate $\tilde{G}(i_F)$ may be computed as $$\tilde{W}(i_F) = (\tilde{G}(i_F)^H \tilde{G}(i_F))^{-1} \tilde{G}(i_F)^H \quad (13)$$

Pre-multiplying the received symbols $r(i_A, i_S, i_F)$ by $\tilde{W}(i_F)$ zero-forcing-equalises the received symbols, leaving the phase-offset transmitted symbols:

$$\sum_{i_A=1}^{N_A} \tilde{w}(i_U, i_A, i_F) r(i_A, i_S, i_F) = p(i_U, i_S) x(i_U, i_S, i_F) + n(i_U, i_S, i_F) \quad (14)$$

The transmitted pilot symbol $x(i_S,i_S,i_F(i_P))$ at the $i_P$-th pilot sub-carrier is known at the access point 110. An estimate $\tilde{p}(i_U,i_S,i_F(i_P))$ of the phase offset $p(i_U,i_S)$ specific to the UT 120-$i_U$ and the $i_S$-th OFDM symbol interval may therefore be formed at the $i_P$-th pilot sub-carrier by normalising the equalised received pilot symbols by the transmitted pilot symbols as follows:

$$\tilde{p}(i_U, i_S, i_F(i_P)) = \frac{\sum_{i_A=1}^{N_A} \tilde{w}(i_U, i_A, i_F(i_P)) r(i_A, i_S, i_F(i_P))}{x(i_U, i_S, i_F(i_P))} \quad (15)$$

The estimate $\tilde{p}(i_U,i_S,i_F(i_P))$ may be averaged over all $N_P$ pilot sub-carriers as follows:

$$\tilde{p}(i_U, i_S) = \frac{1}{N_P} \sum_{i_P=1}^{N_P} \tilde{p}(i_U, i_S, i_F(i_P)) \quad (16)$$

At the $i_S$-th OFDM data symbol interval, the received data symbol $r(i_A,i_S,i_F(i_D))$ at the $i_D$-th data sub-carrier from the $i_A$-th FFT module 730-$i_A$ is given by equation (1) as $$r(i_A, i_S, i_F(i_D)) = \quad (17)$$
$$\sum_{i_U=1}^{N_U} [g(i_A, i_U, i_F(i_D)) p(i_U, i_S) x(i_U, i_S, i_F(i_D))] + n(i_A, i_S, i_F(i_D))$$

where $x(i_U,i_S,i_F(i_D))$ is an unknown data symbol transmitted from the UT 120-$i_U$ at the $i_S$-th symbol interval at the $i_D$-th OFDM data sub-carrier.

Following equation (14), the received data symbols may be equalised and phase offset corrected as follows:

$$z(i_U, i_S, i_F(i_D)) = \frac{\sum_{i_A=1}^{N_A} \tilde{w}(i_U, i_A, i_F(i_D)) r(i_A, i_S, i_F(i_D))}{\tilde{p}(i_U, i_S)} \quad (18)$$

The detection of the data symbols $x(i_U,i_S,i_F(i_D))$ is performed by a nearest-neighbour mapping operation on the equalised and phase-offset-corrected symbols $z(i_U,i_S,i_F(i_D))$ as follows:

$$\tilde{x}(i_U, i_S, i_F(i_D)) = \arg\min_{s_i \in Q} |z(i_U, i_S, i_F(i_D)) - s_i| \quad (19)$$

where $Q=\{s_i, i=1, 2, \ldots, 2^q\}$ is the symbol constellation used at the mapping module 605. The detected symbol $\tilde{x}(i_U,i_S,i_F(i_D))$ may be de-mapped to binary data by a de-mapping process that mirrors the mapping carried out by the mapping modules 605.

Figure 8A:
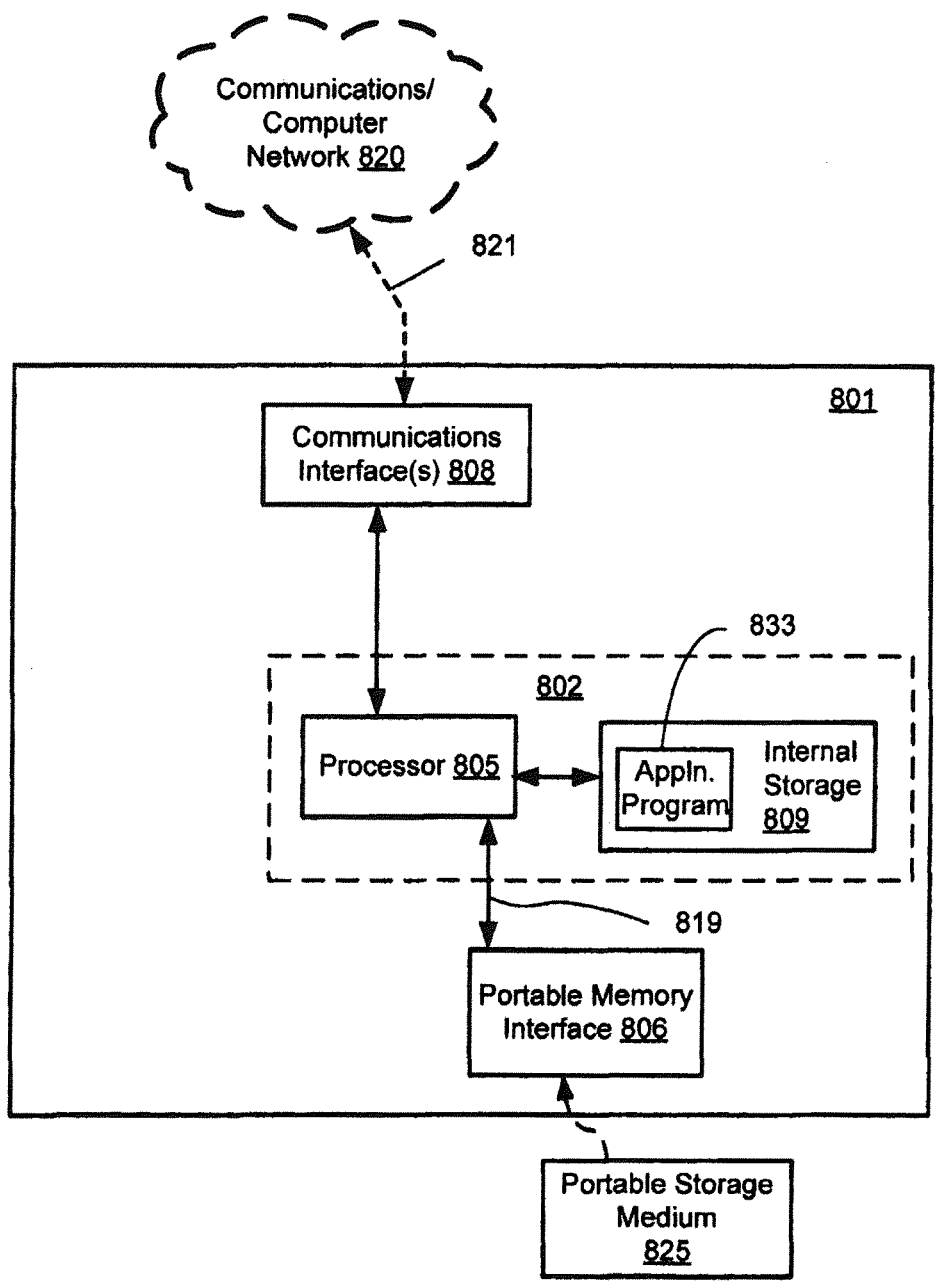
FIGS. 8a and 8b collectively form a schematic block diagram representation of an embedded electronic device as which the various AP signal processing modules in FIGS. 5 and 7 may be implemented.
Figure 8B:
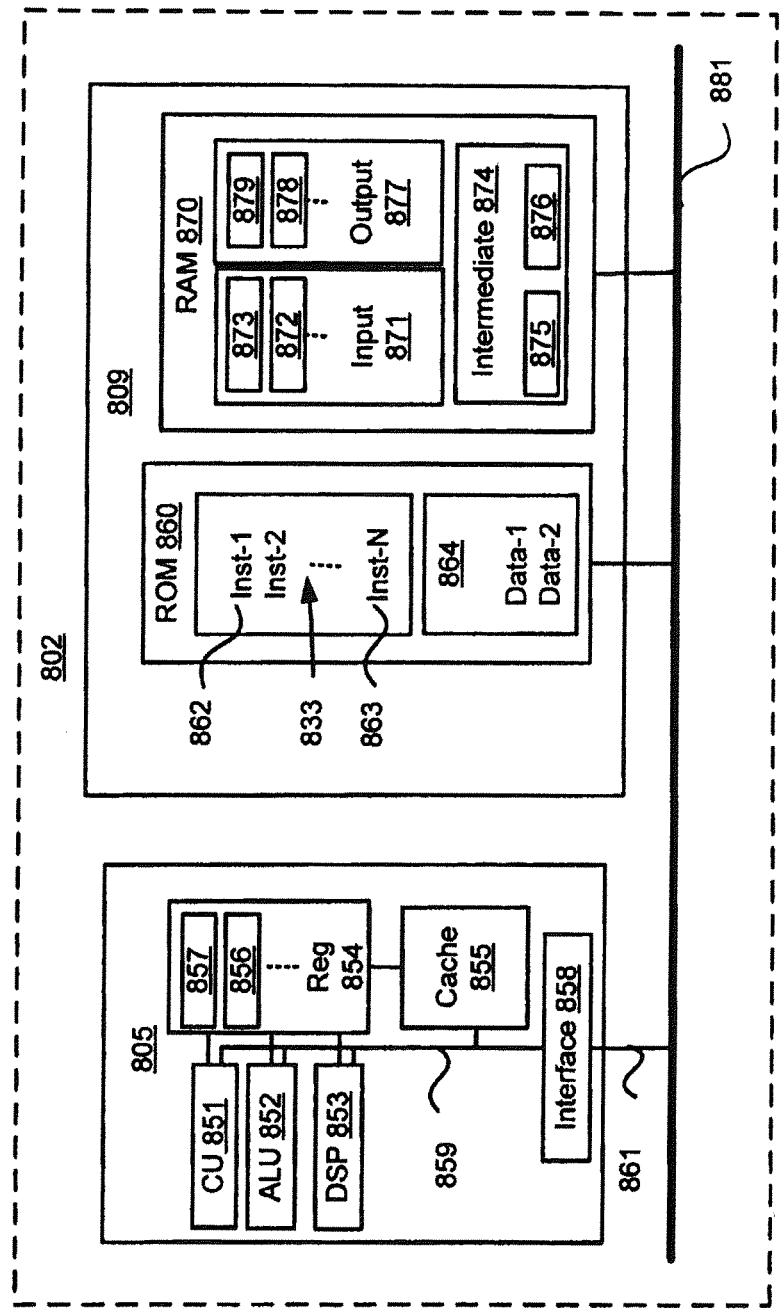

FIGS. 8*a* and 8*b* collectively form a schematic block diagram of a general purpose electronic device 801 including embedded components, in which the various AP signal processing modules of FIGS. 5 and 7 may collectively be implemented. The signal processing modules may alternatively be implemented in dedicated hardware such as one or more integrated circuits performing the functions or sub functions of the signal processing modules. Such dedicated hardware may include graphic processors, digital signal processors, or one or more microprocessors and associated memories.

As seen in FIG. 8*a*, the electronic device 801 comprises an embedded controller 802. Accordingly, the electronic device 801 may be referred to as an "embedded device." In the present example, the controller 802 has a processing unit (or processor) 805 which is bi-directionally coupled to an internal storage module 809. The storage module 809 may be formed from non-volatile semiconductor read only memory (ROM) 860 and semiconductor random access memory (RAM) 870, as seen in FIG. 8*b*. The RAM 870 may be volatile, non-volatile or a combination of volatile and non-volatile memory.

As seen in FIG. 8*a*, the electronic device 801 also comprises a portable memory interface 806, which is coupled to the processor 805 via a connection 819. The portable memory interface 806 allows a complementary portable memory device 825 to be coupled to the electronic device 801 to act as a source or destination of data or to supplement the internal storage module 809. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 801 also has a communications interface 808 to permit coupling of the electronic device 801 to a computer or communications network 820 via a connection 821. The connection 821 may be wired or wireless. For example, the connection 821 may be radio frequency or optical. An example of a wired connection includes Ethernet. Further, an example of wireless connection includes Bluetooth type local interconnection, Wi-Fi (including protocols based on the standards of the IEEE 802.11 family), Infrared Data Association (IrDa) and the like.

The method of FIG. 3 may be implemented as one or more software application programs 833 executable within the embedded controller 802. In particular, with reference to FIG. 8*b*, the steps of the described method are effected by instructions in the software 833 that are carried out within the embedded controller 802. The software instructions may be formed as one or more code modules, each for performing one or more particular tasks.

The software 833 of the embedded controller 802 is typically stored in the non-volatile ROM 860 of the internal storage module 809. The software 833 stored in the ROM 860 can be updated when required from a computer readable medium. The software 833 can be loaded into and executed by the processor 805. In some instances, the processor 805 may execute software instructions that are located in RAM 870. Software instructions may be loaded into the RAM 870 by the processor 805 initiating a copy of one or more code modules from ROM 860 into RAM 870. Alternatively, the software instructions of one or more code modules may be pre-installed in a non-volatile region of RAM 870 by a manufacturer. After one or more code modules have been located in RAM 870, the processor 805 may execute software instructions of the one or more code modules.

The application program 833 is typically pre-installed and stored in the ROM 860 by a manufacturer, prior to distribution of the electronic device 801. However, in some instances, the application programs 833 may be supplied to the user encoded on one or more computer readable storage media 825 and read via the portable memory interface 806 of FIG. 8a prior to storage in the internal storage module 809. In another alternative, the software application program 833 may be read by the processor 805 from the network 820. Computer readable storage media refers to any non-transitory, tangible storage medium that participates in providing instructions and/or data to the embedded controller 802 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the electronic device 801. Examples of computer readable transmission media that may also participate in the provision of software, application programs, instructions and/or data to the electronic device 801 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 8b illustrates in detail the embedded controller 802 having the processor 805 for executing the application programs 833 and the internal storage 809. The internal storage 809 comprises read only memory (ROM) 860 and random access memory (RAM) 870. The processor 805 is able to execute the application programs 833 stored in one or both of the connected memories 860 and 870. When the electronic device 801 is initially powered up, a system program resident in the ROM 860 is executed. The application program 833 permanently stored in the ROM 860 is sometimes referred to as "firmware". Execution of the firmware by the processor 805 may fulfil various functions, including processor management, memory management, device management, storage management and user interface.

The processor 805 typically includes a number of functional modules including a control unit (CU) 851, an arithmetic logic unit (ALU) 852 and a local or internal memory comprising a set of registers 854 which typically contain atomic data elements 856, 857, along with internal buffer or cache memory 855. One or more internal buses 859 interconnect these functional modules. The processor 805 typically also has one or more interfaces 858 for communicating with external devices via system bus 881, using a connection 861.

The application program 833 includes a sequence of instructions 862 though 863 that may include conditional branch and loop instructions. The program 833 may also include data, which is used in execution of the program 833. This data may be stored as part of the instruction or in a separate location 864 within the ROM 860 or RAM 870.

In general, the processor 805 is given a set of instructions, which are executed therein. This set of instructions may be organised into blocks, which perform specific tasks or handle specific events that occur in the electronic device 801. Typically, the application program 833 waits for events and subsequently executes the block of code associated with that event. Events may be triggered in response to input from a user, via the user input devices 813 of FIG. 8a, as detected by the processor 805. Events may also be triggered in response to other sensors and interfaces in the electronic device 801.

The execution of a set of the instructions may require numeric variables to be read and modified. Such numeric variables are stored in the RAM 870. The disclosed method uses input variables 871 that are stored in known locations 872, 873 in the memory 870. The input variables 871 are processed to produce output variables 877 that are stored in known locations 878, 879 in the memory 870. Intermediate variables 874 may be stored in additional memory locations in locations 875, 876 of the memory 870. Alternatively, some intermediate variables may only exist in the registers 854 of the processor 805.

The execution of a sequence of instructions is achieved in the processor 805 by repeated application of a fetch-execute cycle. The control unit 851 of the processor 805 maintains a register called the program counter, which contains the address in ROM 860 or RAM 870 of the next instruction to be executed. At the start of the fetch execute cycle, the contents of the memory address indexed by the program counter is loaded into the control unit 851. The instruction thus loaded controls the subsequent operation of the processor 805, causing for example, data to be loaded from ROM memory 860 into processor registers 854, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the method of FIG. 3 is associated with one or more segments of the application program 833, and is performed by repeated execution of a fetch-execute cycle in the processor 805 or similar programmatic operation of other independent processor blocks in the electronic device 801.

Figure 9A:
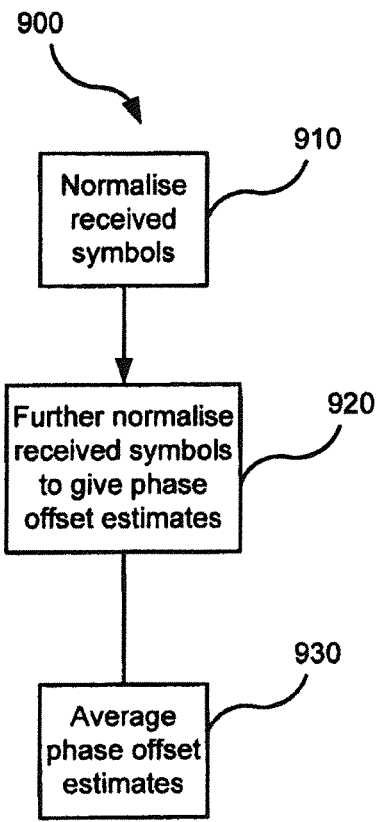
FIG. 9a is a flow chart illustrating a method of estimating phase offsets for channel estimation as used in the method of FIG. 3.

FIG. 9a is a flow chart illustrating a method 900 of estimating phase offsets for channel estimation as used in step 310 of the method 300 of FIG. 3. The method 900 is carried out by the phase offset estimation modules $540\text{-}i_A$ of FIG. 5. The method 900 begins at step 910 where the phase offset estimation module $540\text{-}i_A$ normalises the received pilot symbols in accordance with equation (4). At the next step 920, the phase offset estimation module $540\text{-}i_A$ further normalises the normalised received pilot symbols in accordance with equation (5) to obtain $N_A \times N_C$ UT-symbol-specific phase offset estimates. Finally at step 930, the phase offset estimation module $540\text{-}i_A$ forms an estimate of the UT-symbol-specific phase offsets by averaging the $N_A \times N_C$ UT-symbol-specific phase offset estimates in accordance with equation (7).

Figure 9B:
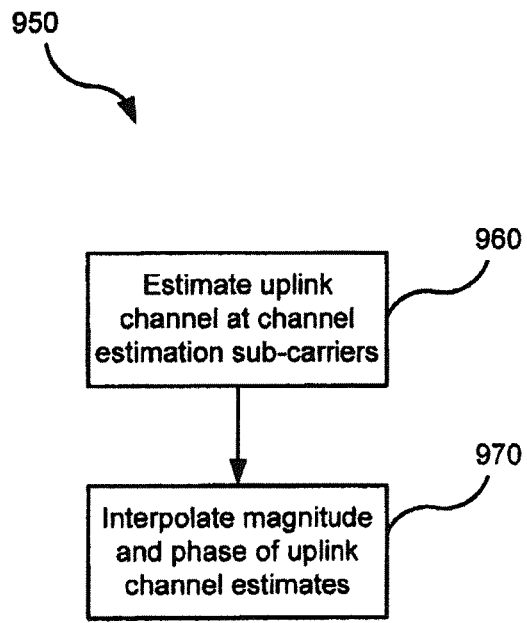
FIG. 9b is a flow chart illustrating a method of estimating the uplink channel as used in the method of FIG. 3.

FIG. 9b is a flow chart illustrating a method 950 of estimating the uplink channel as used in step 320 of the method 300 of FIG. 3. The method 950 is carried out by the channel estimation module 550 of FIG. 5. The method 950 starts at step 960 where the channel estimation module 550 forms an estimate of the uplink channel at the $N_E$ channel estimation sub-carriers using the UT-symbol-specific phase offset estimates in accordance with equation (9). Step 970 follows, at which the channel estimation module 550 interpolates the channel estimates at the $N_E$ channel estimation sub-carriers to the $N_C \times N_U$ phase offset estimation sub-carriers using equations (11a) and (11b).

Figures 10A, 10B:
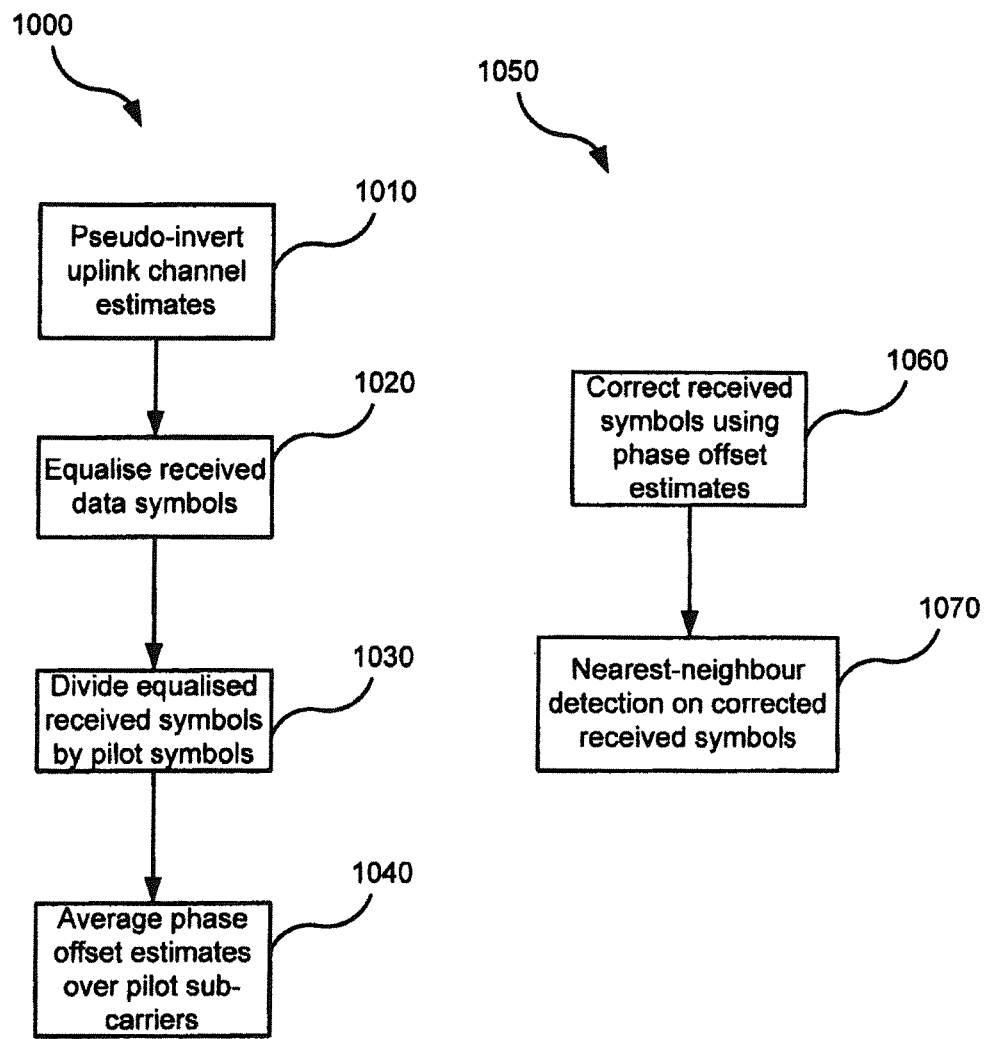
FIG. 10a is a flow chart illustrating a method of estimating phase offsets during data detection as used in the method of FIG. 3.
FIG. 10b is a flow chart illustrating a method of detecting data symbols as used in the method of FIG. 3.

FIG. 10a is a flow chart illustrating a method 1000 of estimating phase offsets during data detection as used in step 330 of the method 300 of FIG. 3. The method 1000 is carried out by the equalisation module 740 and the phase offset estimation modules $750\text{-}i_U$ of FIG. 7. The method 1000 starts at step 1010 where the equalisation module 740 forms a pseudo-inverse of the estimated uplink channel, in accordance with equation (13). Step 1020 follows, at which the equalisation module 740 equalises the received data symbols in accordance with equation (14). Next, at step 1030, the phase offset estimation module 750-$i^U$ divides the equalised received symbols by the transmitted pilot symbols to form estimates of the UT-symbol-specific phase offsets at each pilot sub-carrier, in accordance with equation (15). Finally at step 1040, the phase offset estimation module 750-$i_U$ averages the phase offset estimates over all $N_P$ pilot sub-carriers, in accordance with equation (16), to form UT-symbol-specific phase estimates for the data symbols.

FIG. 10*b* is a flow chart illustrating a method 1050 of detecting data symbols as used in step 340 of the method 300 of FIG. 3. The method 1050 is carried out by the data detection modules 760-$i_U$ of FIG. 7. The method 1050 starts at step 1060, where the data detection module 760-$i_U$ corrects the UT-symbol-specific phase offsets of the equalised received data symbols, in accordance with equation (18). Finally at step 1070, the data detection module 760-$i_U$ detects the transmitted symbols by a nearest-neighbour operation on the phase-offset-corrected equalised received data symbols, in accordance with equation (19).

The arrangements described are applicable to the wireless communication industries.

The foregoing describes only some embodiments of the present invention, and modifications and/or changes can be made thereto without departing from the scope and spirit of the invention, the embodiments being illustrative and not restrictive.

The invention claimed is:

1. A method of estimating an uplink channel in a wireless communication system comprising an access point and a plurality of remote user terminals adapted to transmit symbols via OFDM to the access point over said uplink channel, the method comprising:
   receiving, at the access point, one or more training symbols transmitted by the user terminals, each training symbol comprising:
      pilot symbols associated with phase offset estimation OFDM sub-carriers of said training symbol, the phase offset estimation sub-carriers comprising subsets of sub-carriers associated with respective user terminals, wherein each subset is used exclusively by the associated user terminal during channel estimation, and
      further symbols associated with channel estimation OFDM sub-carriers of said training symbol, wherein the channel estimation sub-carriers are used in common by all the user terminals;
   estimating, for each user terminal, symbol-specific phase offsets specific to the user terminal using the received pilot symbols associated with the subset of the phase offset estimation sub-carriers associated with the user terminal; and
   estimating the uplink channel using the user-terminal-symbol-specific phase offset estimates and the received further symbols.

2. A method according to claim 1, wherein said estimating the phase offsets comprises:
   normalising each received pilot symbol by a corresponding transmitted pilot symbol;
   further normalising each normalised received pilot symbol by a first normalised received pilot symbol; and
   obtaining the user-terminal-symbol-specific phase offsets from the further normalised received pilot symbols.

3. A method according to claim 2, wherein said obtaining comprises averaging the further normalised received pilot symbols over all the phase offset estimation sub-carriers in the subset of the sub-carriers associated with the user terminal.

4. A method according to claim 3, wherein the access point comprises a plurality of receive antennas and said averaging further comprises averaging the further normalised received pilot symbols over all the receive antennas.

5. A method according to claim 1, wherein said estimating the uplink channel comprises:
   phase correcting the further symbols transmitted by the user terminals using the user-terminal-symbol-specific phase offset estimates;
   estimating the uplink channel at the channel estimation sub-carriers using the phase corrected transmitted further symbols and the corresponding received further symbols; and
   interpolating the uplink channel estimates at the phase offset estimation sub-carriers from the uplink channel estimates at the channel estimation sub-carriers.

6. A method according to claim 5, wherein the interpolation is bilinear interpolation separately in magnitude and phase.

7. A method according to claim 5, wherein the estimating the uplink channel comprises:
   forming a pseudo-inverse of the phase-corrected transmitted further symbols; and
   pre-multiplying the pseudo-inverse by the corresponding received further symbols.

8. A method according to claim 1, further comprising:
   receiving, at the access point, one or more data symbols transmitted by the user terminals, each data symbol comprising:
      pilot symbols associated with pilot OFDM sub-carriers of said data symbol, wherein the pilot symbols transmitted on the pilot sub-carriers are known at the access point, and
      further symbols associated with data OFDM sub-carriers of said data symbol;
   estimating, for each transmitted data symbol and each user terminal, phase offsets using the estimated uplink channel; and
   detecting, for each user terminal, the transmitted further symbols using the corresponding phase offset estimates specific to that user terminal.

9. A method according to claim 8, wherein the estimating comprises:
   equalising the received pilot symbols associated with the pilot sub-carriers;
   normalising the equalised pilot symbols by the transmitted pilot symbols; and
   averaging the normalised symbols over all pilot sub-carriers.

10. A method according to claim 8, wherein the detecting comprises:
    equalising the received further symbols associated with the data sub-carriers;
    correcting the equalised further symbols using the phase offset estimates; and
    mapping the phase corrected equalised symbols to the nearest neighbour in the transmitted symbol constellation.

11. A wireless communication system comprising:
    an access point, and
    a plurality of remote user terminals adapted to transmit symbols via OFDM to the access point over an uplink channel, wherein the access point is adapted to:
- receive one or more training symbols transmitted by the user terminals, each training symbol comprising:
  - pilot symbols associated with phase offset estimation OFDM sub-carriers of said training symbol, the phase offset estimation sub-carriers comprising subsets of sub-carriers associated with respective user terminals, wherein each subset is used exclusively by the associated user terminal during channel estimation, and
  - further symbols associated with channel estimation OFDM sub-carriers of said training symbol, wherein the channel estimation sub-carriers are used in common by all the user terminals;
- estimate, for each user terminal, symbol-specific phase offsets specific to the user terminal using the received pilot symbols associated with the subset of the phase offset estimation sub-carriers associated with the user terminal; and
- estimate the uplink channel using the user-terminal-symbol-specific phase offset estimates and the received further symbols.

12. An access point in a wireless communication system further comprising a plurality of remote user terminals adapted to transmit symbols via OFDM to the access point over an uplink channel, the access point being adapted to:
- receive one or more training symbols transmitted by the user terminals, each training symbol comprising:
  - pilot symbols associated with phase offset estimation OFDM sub-carriers of said training symbol, the phase offset estimation sub-carriers comprising subsets of sub-carriers associated with respective user terminals, wherein each subset is used exclusively by the associated user terminal during channel estimation, and
  - further symbols associated with channel estimation OFDM sub-carriers of said training symbol, wherein the channel estimation sub-carriers are used in common by all the user terminals;
- estimate, for each user terminal, symbol-specific phase offsets specific to the user terminal using the received pilot symbols associated with the subset of the phase offset estimation sub-carriers associated with the user terminal; and
- estimate the uplink channel using the user-terminal-symbol-specific phase offset estimates and the received further symbols.

* * * * *